(12) United States Patent
Miller et al.

(10) Patent No.: US 11,486,410 B2
(45) Date of Patent: Nov. 1, 2022

(54) SPRING SPACER COUPLING

(71) Applicant: ITT MANUFACTURING ENTERPRISES LLC, Wilmington, DE (US)

(72) Inventors: Daniel Stephen Miller, Fontana, CA (US); Paul Walter Behnke, Newport Coast, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 985 days.

(21) Appl. No.: 16/230,847

(22) Filed: Dec. 21, 2018

(65) Prior Publication Data

US 2019/0195233 A1    Jun. 27, 2019

Related U.S. Application Data

(60) Provisional application No. 62/609,784, filed on Dec. 22, 2017.

(51) Int. Cl.
| | | |
|---|---|---|
| *F04D 29/044* | (2006.01) | |
| *F04D 13/02* | (2006.01) | |
| *F16D 3/72* | (2006.01) | |

(52) U.S. Cl.
CPC ......... *F04D 29/044* (2013.01); *F04D 13/021* (2013.01); *F16D 3/72* (2013.01); *Y10T 403/54* (2015.01)

(58) Field of Classification Search
CPC ........ F04D 29/044; F04D 13/021; F16D 3/72; Y10T 403/54

(Continued)

(56) References Cited

U.S. PATENT DOCUMENTS 3,942,466 A * 3/1976 Bunyan ................... F16D 3/72
                                                             403/291
4,102,052 A 7/1978 Bloch
(Continued)

FOREIGN PATENT DOCUMENTS

| CN | 2152936 Y | 1/1994 |
| CN | 111615593 A | 9/2020 |

(Continued)

OTHER PUBLICATIONS

Chinese Office Action dated Jan. 27, 2022 for Corresponding Chinese Application No. 201880087084.3 (25 pages).

(Continued)

*Primary Examiner* — Greg Binda
(74) *Attorney, Agent, or Firm* — Carter, DeLuca & Farrell LLP; George Likourezos; Bret Shapiro

(57) ABSTRACT

Devices to couple a drive hub to a driven hub. The devices may comprise a drive hub contoured end connected to a first end of a spacer column and to a spacer drive hub flange. A portion of the drive hub contoured end may project radially out from the spacer column with a first contoured side and a first flat side and may allow movement in an axial direction and transmit torque and an axial load. The devices may comprise a driven hub contoured end connected to a second end of the spacer column and to a spacer driven hub flange. A portion of the driven hub contoured end may project radially out from the spacer column with a second contoured side and a second flat side and may allow movement in an axial direction and transmit torque and an axial load.

16 Claims, 4 Drawing Sheets

(58) Field of Classification Search
USPC .......................................................... 464/99
See application file for complete search history.

(56) References Cited

U.S. PATENT DOCUMENTS

| | | | |
|---|---|---|---|
| 5,158,504 A | 10/1992 | Stocco | |
| 5,899,813 A | 5/1999 | Bunce | |
| 6,508,714 B1 * | 1/2003 | Zilberman | ................ F16D 3/72 |
| 2003/0157987 A1 | 8/2003 | Zilberman et al. | |

FOREIGN PATENT DOCUMENTS

| | | |
|---|---|---|
| EP | 0211090 A1 | 2/1987 |
| EP | 0397314 A1 | 11/1990 |
| EP | 1965091 A1 | 9/2008 |
| EP | 3728887 A1 | 10/2020 |
| GB | 1141917 A | 2/1969 |
| GB | 2181515 A | 4/1987 |
| WO | 2019126765 A1 | 6/2019 |

OTHER PUBLICATIONS

International Search Report for corresponding International Application No. PCT/US2018/067314 dated May 8, 2019 (3 pages).

\* cited by examiner

Fig. 4

S2 — Attach a spacer drive hub flange of the spring spacer coupling to a drive hub with drive hub bolts, wherein the drive hub is attached to the drive shaft, the spacer drive hub flange of the spring spacer is connected to a radial outside edge of a drive hub contoured end, the drive hub contoured end is connected to a first end of a spacer column, a driven hub contoured end is connected to a second end of the spacer column, and a spacer driven hub flange is connected to a radial outside edge of the driven hub contoured end S4 — Attach the spacer driven hub flange of the spring spacer coupling to a driven hub with driven hub bolts, wherein the driven hub is attached to the driven shaft, wherein a portion of the drive hub contoured end projects radially out from the first end of the spacer column with a first contoured side and a first flat side, the drive hub contoured end is configured to allow movement in an axial direction relative to a central axis of the spacer column, and the drive hub contoured end is configured to transmit torque and an axial load and a portion of the driven hub contoured end projects radially out from the second end of the spacer column with a second contoured side and a second flat side, the driven hub contoured end is configured to allow movement in an axial direction relative to the central axis of the spacer column, and the driven hub contoured end is configured to transmit torque and an axial load

SPRING SPACER COUPLING

CROSS REFERENCE TO RELATED APPLICATION

This application claims priority under 35 U.S.C. § 119(e) to provisional application U.S. 62/609,784 filed on Dec. 22, 2017, the entirety of which is hereby incorporated by reference.

BACKGROUND

Unless otherwise indicated herein, the materials described in this section are not prior art to the claims in this application and are not admitted to be prior art by inclusion in this section.

A pump may be a device that mechanically moves fluids or slurries. A pump may be vertical or horizontal based on certain applications. A pump may include a driver motor, a discharge head, a pipe column, and a bowl assembly. An impeller or multiple impellers may be included in the bowl assembly. A spacer coupling may be axially connected to a drive shaft of the driver at a drive hub and axially connected to a driven shaft connected to the impeller(s) at a driven (pump) hub. The spacer coupling may transmit torque and axial load from the drive shaft to the driven shaft and also allow for ease of maintenance of the pump.

SUMMARY

One embodiment of the invention is a device to couple a drive hub to a driven hub. The devices may comprise a spacer column. The spacer column may have a first end, a second end, and a central axis. The devices may comprise a drive hub contoured end connected to the first end of the spacer column. A portion of the drive hub contoured end may project radially out from the first end of the spacer column with a first contoured side and a first flat side. The drive hub contoured end may be configured to allow movement in an axial direction relative to the central axis of the spacer column. The drive hub contoured end may be configured to transmit torque and an axial load. The devices may comprise a spacer drive hub flange connected to a radial outside edge of the drive hub contoured end. The space drive hub flange may be configured to couple with the drive hub. The devices may comprise a driven hub contoured end connected to the second end of the spacer column. A portion of the driven hub contoured end may project radially out from the second end of the spacer column with a second contoured side and a second flat side. The driven hub contoured end may be configured to allow movement in an axial direction relative to the spacer column. The driven hub contoured end may be configured to transmit torque and an axial load. The devices may comprise a spacer driven hub flange connected to a radial outside edge of the driven hub contoured end. The spacer driven hub flange may be configured to couple to the driven hub.

Another embodiment of the invention includes a system for coupling a drive shaft to a driven shaft. The systems may comprise a driver. The systems may comprise a drive shaft. The drive shaft may be rotationally driven by the driver. The systems may comprise a drive hub. The drive hub may be connected to the drive shaft. The systems may comprise a driven hub. The systems may comprise a driven shaft. The driven shaft may be connected to the driven hub. The systems may comprise a spring spacer coupling. The spring spacer coupling may include a spacer column. The spacer column may have a first end, a second end, and a central axis. The spring spacer coupling may include a drive hub contoured end connected to the first end of the spacer column. A portion of the drive hub contoured end may project radially out from the first end of the spacer column with a first contoured side and a first flat side. The drive hub contoured end may be configured to allow movement in an axial direction relative to the central axis of the spacer column. The drive hub contoured end may be configured to transmit torque and an axial load. The spring spacer coupling may include a spacer drive hub flange connected to a radial outside edge of the drive hub contoured end. The spacer drive hub flange may be configured to couple with the drive hub. The spring spacer coupling may include a driven hub contoured end connected to the second end of the spacer column. A portion of the driven hub contoured end may project radially out from the second end of the spacer column with a second contoured side and a second flat side. The driven hub contoured end may be configured to allow movement in an axial direction relative to the spacer column. The driven hub contoured end may be configured to transmit torque and an axial load. The spring spacer coupling may include a spacer driven hub flange connected to a radial outside edge of the driven hub contoured end. The spacer driven hub flange may be configured to couple to the driven hub.

Another embodiment of the invention is a method to attach a spring spacer coupling to a drive shaft and a driven shaft. The methods may comprise attaching a spacer drive hub flange of the spring spacer coupling to a drive hub with drive hub bolts. The drive hub may be attached to the drive shaft. The spacer drive hub flange of the spring spacer may be connected to a radial outside edge of a drive hub contoured end. The drive hub contoured end may be connected to a first end of a spacer column. A driven hub contoured end may be connected to a second end of the spacer column. A spacer driven hub flange may be connected to a radial outside edge of the driven hub contoured end. The methods may comprise attaching the spacer driven hub flange of the spring spacer coupling to a driven hub with driven hub bolts. The driven hub may be attached to the driven shaft. A portion of the drive hub contoured end may project radially out from the first end of the spacer column with a first contoured side and a first flat side. The drive hub contoured end may be configured to allow movement in an axial direction relative to a central axis of the spacer column. The drive hub contoured end may be configured to transmit torque and an axial load. A portion of the driven hub contoured end may project radially out from the second end of the spacer column with a second contoured side and a second flat side. The driven hub contoured end may be configured to allow movement in an axial direction relative to the central axis of the spacer column. The driven hub contoured end may be configured to transmit torque and an axial load.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates a flow diagram for an example process to attach a spring coupler to a drive hub and a driven hub of a pump; all arranged according to at least some embodiments described herein.

DETAILED DESCRIPTION

Figure 1:
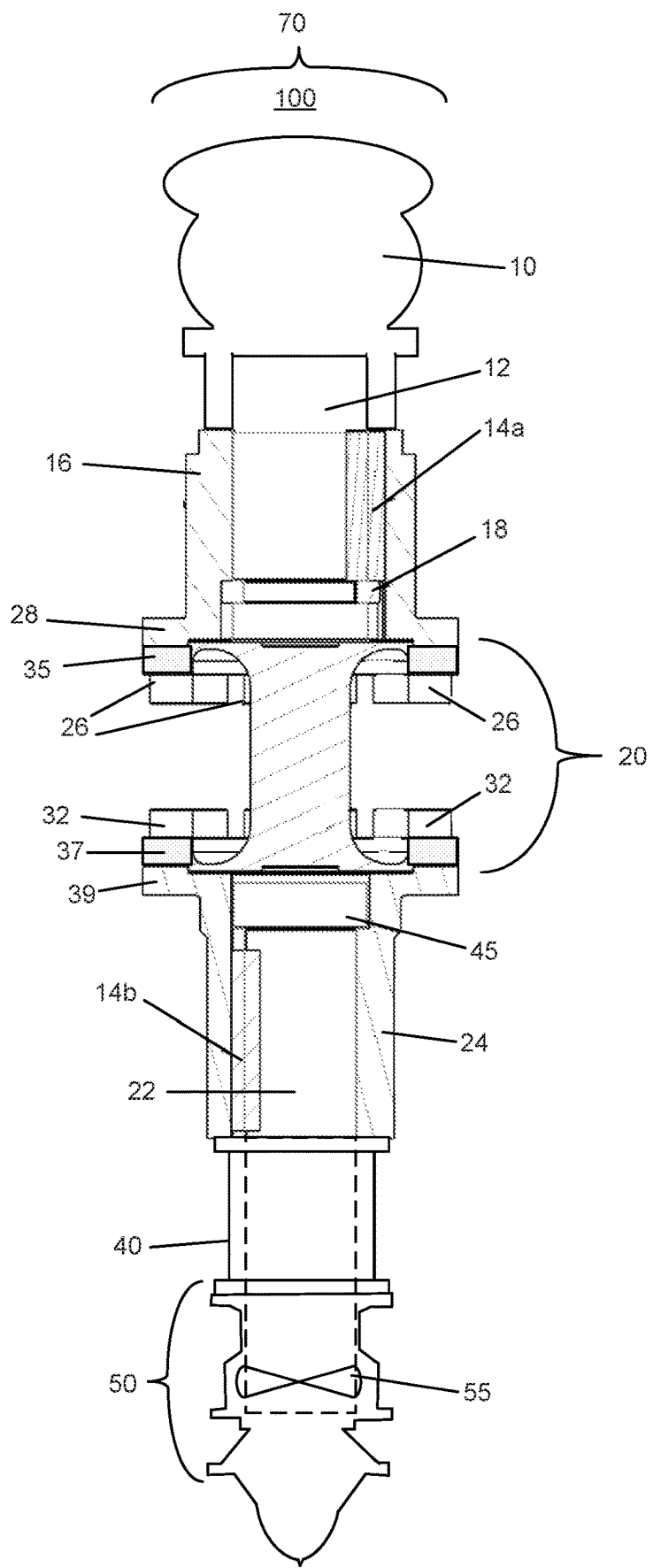
FIG. 1 is a side view illustrating a pump with a spring spacer coupling.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a side view illustrating a pump with a spring spacer coupling, arranged in accordance with at least some embodiments described herein. System 100 may include a pump 70. Pump 70 may include a driver 10, a drive shaft 12, a drive hub 16, a spring spacer coupling 20, a driven shaft 22, a driven hub 24, a pipe column 40, and a bowl assembly 50. Driver 10 may include a motor which may rotate drive shaft 12 at specified speeds (rev/min). Drive shaft 12 may be attached to drive hub 16 by way of a key 14a. Key 14a may be secured in grooves in drive shaft 12 and drive hub 16 and key 14a may secure drive hub 16 to drive shaft 12 radially such that drive hub 16 rotates with drive shaft 12. Split ring 18 may be secured in drive shaft 12 groove and inside drive hub 16 and split ring 18 may secure drive hub 16 to drive shaft 12 axially. Spring spacer coupling 20 may be attached to drive hub 16 by drive hub bolts 26 through spacer drive hub flange 35 and drive hub flange 28. Spacer 20 may rotate with drive hub 16 and drive shaft 12. Spacer 20 may also be attached to driven hub 24 with driven hub bolts 32 through spacer driven hub flange 37 and driven hub flange 39. Driven hub 24 may rotate with spacer 20, drive hub 16 and drive shaft 12. Driven hub 24 may be attached to driven shaft 22 by way of a key 14b proximate to a first end of driven shaft 22. Key 14b may be secured in grooves in driven shaft 22 and driven hub 24 and may secure driven hub 24 to driven shaft 22 axially such that driven shaft 22 rotates with driven hub 24, spacer 20, drive hub 16, and drive shaft 12. Driven shaft 22 may extend through pipe column 40 and be attached to impellers 55 at a second end of driven shaft 22 within bowl assembly 50. Pipe column 40 and bowl assembly 50 may be connected and may be stationary relative to driven shaft 22. Driven shaft 22 may rotate impellers 55 within bowl assembly 50 when driven shaft is rotated. As described in more detail below, spring spacer coupling 20 may transfer torque and axial load from drive shaft 12 to driven shaft 22 with a range of axial movement.

Figure 2:
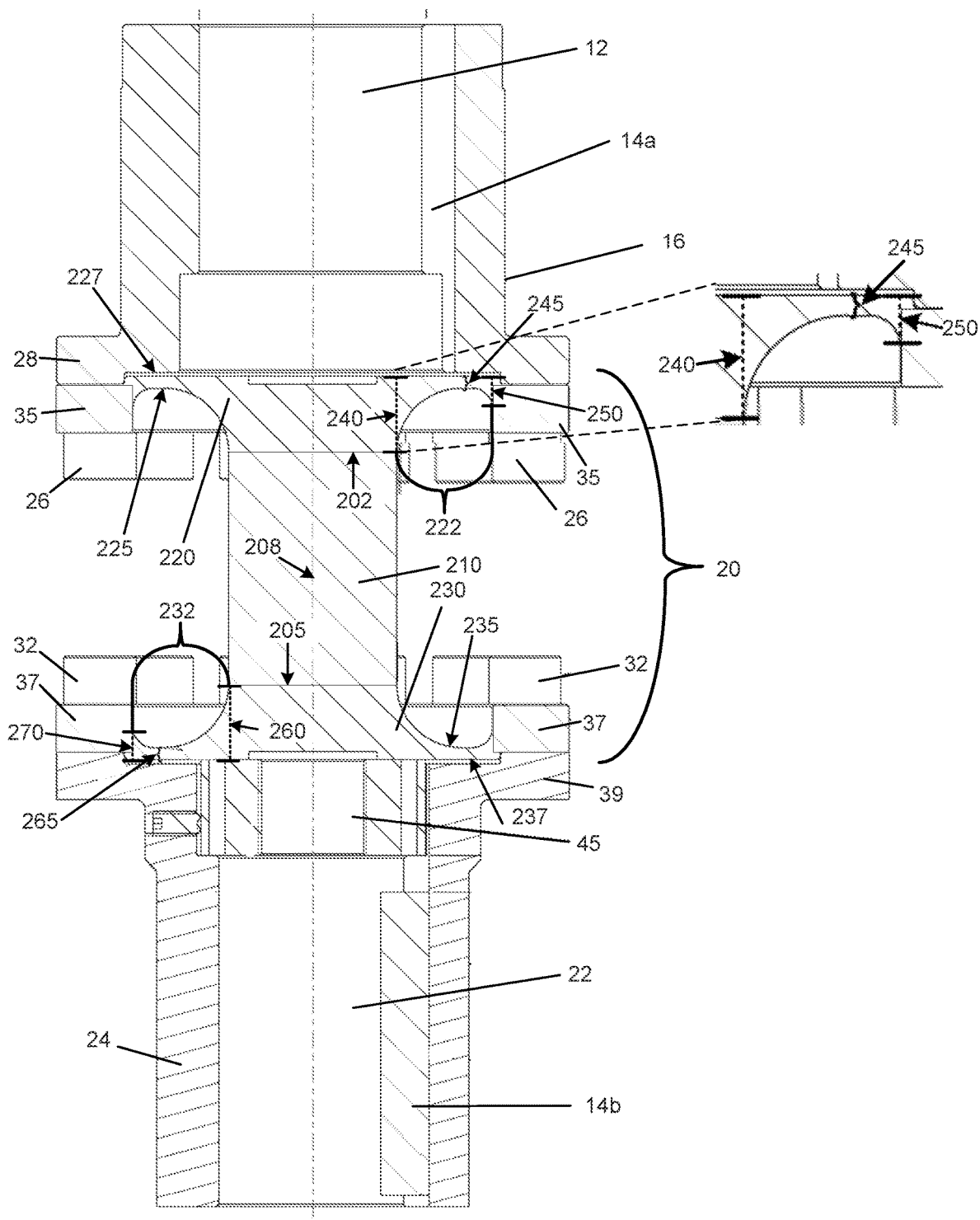
FIG. 2 is a side view illustrating a spring spacer coupling attached to a drive hub and a driven hub.

FIG. 2 is a side view illustrating an adjustable rigid spacer coupling attached to a driven hub and a driven hub, arranged in accordance with at least some embodiments presented herein. Those components in FIG. 2 that are labeled identically to components of FIG. 1 will not be described again for the purposes of brevity.

Spring spacer coupling 20 may include a spacer drive hub flange 35, spacer driven hub flange 37, a spacer column 210, a drive hub contoured end 220, and a driven hub contoured end 230. Spacer column 210 may be cylindrical and have a first end 202, a second end 205 and a center axis 208. First end 202 of spacer column 210 may be connected to drive hub contoured end 220. Spacer drive hub flange 35 may be a flat ring and may be connected to a radial outside edge of drive hub contoured end 220. Second end 205 of spacer column 210 may be connected to driven hub contoured end 230. Spacer driven hub flange 37 may be a flat ring and may be connected to a radial outside edge of driven hub contoured end 230.

Drive hub bolts 26 may attach spacer drive hub flange 35 and drive hub flange 28 and may transmit torque and axial load from drive hub 16 to spacer drive hub flange 35. Drive hub contoured end 220 may be attached to first end 202 of spacer column 210 and a portion 222 of drive hub contoured end 220 may project radially out from first end 202 of spacer column 210 to spacer drive hub flange 35. Portion 222 of drive hub contoured end 220 projecting between first end 202 of spacer column 210 and drive hub flange 35 may have a contoured side 225 towards spacer column 210 and a flat side 227 opposite contoured side 225. A thickness of portion 222 of drive hub contoured end 220 may contour on contour side 225 as portion 222 of drive hub contoured end 220 projects from spacer column 210 to spacer drive hub flange 35. Portion 222 of drive hub contoured end 220 may have a thickness of 240 at contact with first end 202 of spacer column 210. Portion 222 of drive hub contoured end 220 may decrease in thickness to 245 as portion 222 of drive hub contoured end 220 projects away from spacer column 210. Thickness 240 may be greater than thickness 245. Portion 222 of drive hub contoured end 220 may increase in thickness from 245 to 250 as portion 222 of drive hub contoured end 220 projects from thickness 245 to spacer drive hub flange 35. Thickness 250 may be greater than thickness 245. Portion 222 of drive hub contoured end 220 may have a thickness of 250 at contact with spacer drive hub flange 35. Drive hub contoured end 220 may flex axially and allow movement in an axial direction relative to center axis 208 of spacer column 210. Drive hub contoured end 220 may provide axial flexibility relative to center axis 208 of spacer column 210 between spacer drive hub flange 35 and spacer column 210. Drive hub contoured end 220 may act as a linear spring as defined by Hooke's Law when a force is applied to drive hub contoured end 220 in an axial direction. Drive hub contoured end 220 may flex proportionally to a force applied to drive hub contoured end 220 in an axial direction. Drive hub contoured end 220 connected to spacer drive hub flange 35 may transmit torque and axial load from spacer drive hub flange 35 to spacer column 210.

Spacer column 210 may transmit torque and axial load from drive hub contoured end 220 to driven hub contoured end 230. Driven hub contoured end 230 may be attached to second end 205 of spacer column 210 and a portion 232 of driven hub contoured end 230 may project radially out from second end 205 of spacer column 210 to spacer driven hub flange 37. Portion 232 of driven hub contoured end 230 projecting between second end 205 of spacer column 210 and driven hub flange 37 may have a contoured side 235 towards spacer column 210 and a flat side 237 opposite contoured side 235. A thickness of portion 232 of driven hub contoured end 230 may contour on contour side 235 as portion 232 of driven hub contoured end 230 projects from spacer column 210 to spacer driven hub flange 37. Portion 232 of driven hub contoured end 230 may have a thickness of 260 at contact with spacer column 210. Portion 232 of driven hub contoured end 230 may decrease in thickness to 265 as portion 232 of driven hub contoured end 230 projects away from spacer column 210. Thickness 260 may be greater than thickness 265. Portion 232 of driven hub contoured end 230 may increase in thickness from 265 to 270 as portion 232 of driven hub contoured end 230 projects from thickness 265 to spacer driven hub flange 37. Thickness 270 may be greater than thickness 265. Portion 232 of driven hub contoured end 230 may have a thickness of 270 at contact with spacer driven hub flange 37. Driven hub contoured end 230 may flex axially and allow movement in an axial direction relative to center axis 208 of spacer column 210. Driven hub contoured end 230 may provide axial flexibility relative to center axis 208 of spacer column 210 between spacer column 210 and spacer driven hub flange 37. Driven hub contoured end 230 may behave like a linear spring as defined by Hooke's Law when a force is applied to driven hub contoured end 230 in an axial direction. Driven hub contoured end 230 may flex proportionally to a force applied to driven hub contoured end 230 in an axial direction. Driven hub bolts 32 may attach spacer driven hub flange 37 and driven hub flange 39 and may transmit torque and axial load from spacer driven hub flange 37 to driven hub flange 39. Axial flexibility of drive hub contoured end 220 and driven hub contoured end 230 may allow a range of axial movement for spring spacer coupling 20 and may allow for coupling of a drive shaft and a driven shaft with a misalignment of axes by spring spacer coupling 20.

Thickness 245 of drive hub contoured end 220 may affect axial flexibility of drive hub contoured end 220 and thickness 245 may be increased or decreased to increase or decrease axial flexibility of drive hub contoured end 220. Thickness 265 of driven hub contoured end 230 may affect axial flexibility of driven hub contoured end 230 and thickness 265 may be increased or decreased to increase or decrease axial flexibility of driven hub contoured end 230. Thickness 245 of drive hub contoured end 220 may be the same or different as thickness 265 of driven hub contoured end 230 and axial flexibility of drive hub contoured end 220 may be the same or different as axial flexibility of driven hub contoured end 230. A flexibility of spring spacer coupling 20 may be a combination of the flexibility of drive hub contoured end 220 and driven hub contoured end 230.

Figure 3:
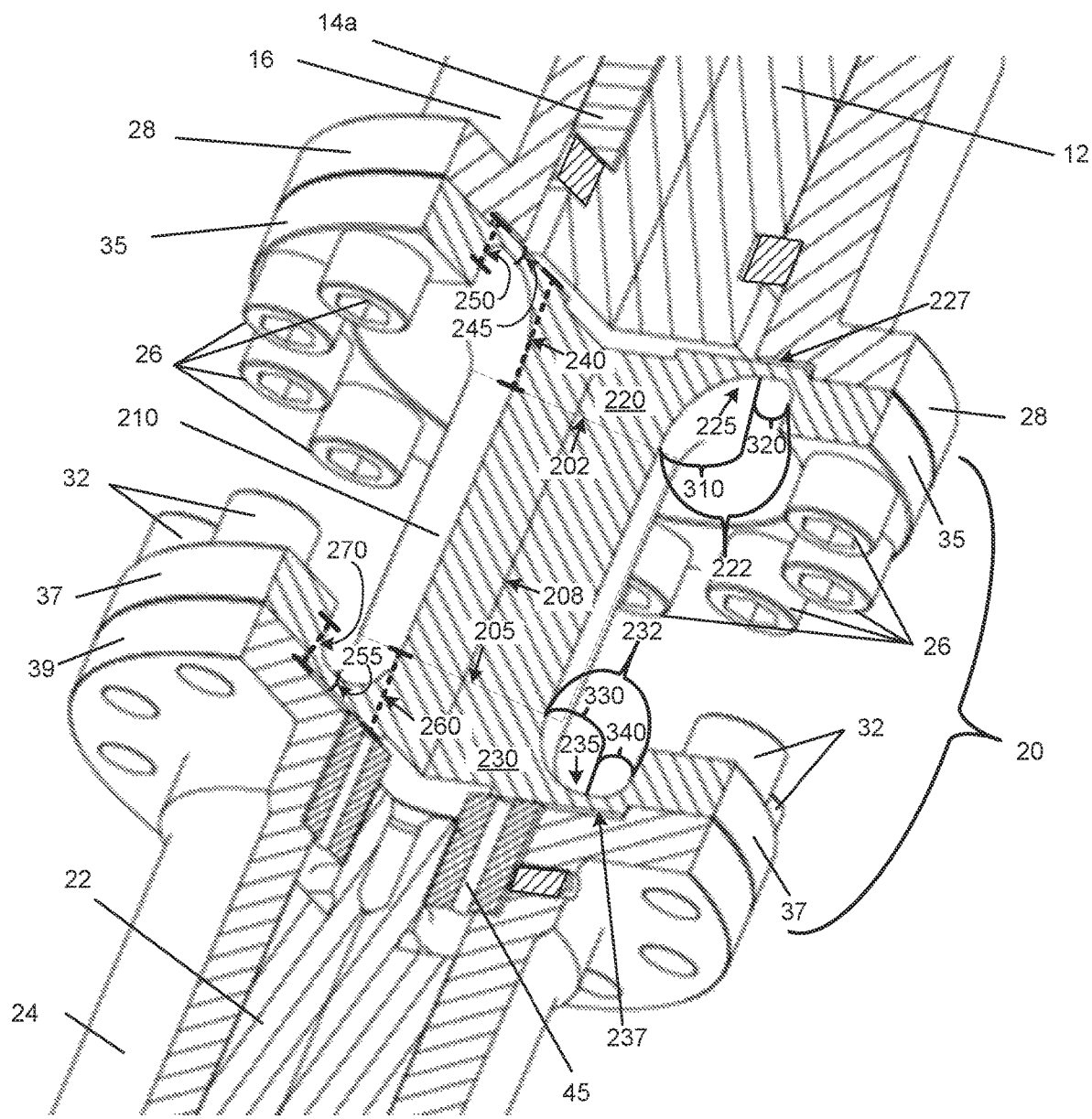
FIG. 3 is a cutout perspective view illustrating a spring spacer coupling attached to a drive hub and a driven hub.

FIG. 3 is a cutout side perspective view illustrating a spring spacer coupling attached to a driven hub and a driven hub, arranged in accordance with at least some embodiments presented herein. Those components in FIG. 3 that are labeled identically to components of FIGS. 1-2 will not be described again for the purposes of brevity.

Portion 222 of drive hub contoured end 220 may project radially out from first end 202 of spacer column 210 to spacer drive hub flange 35. As shown in cutout side perspective view, portion 222 of drive hub contoured end 220 may be contoured and curve as drive hub contoured end 220 projects from first end 202 of spacer column 210 to spacer drive hub flange 35. Portion 222 of drive hub contoured end 220 may have a thickness of 240 at contact with first end 202 of spacer column 210. Contoured side 225 of portion 222 of drive hub contoured end 220 may have a curved profile 310 as portion 222 of drive hub contoured end 220 decreases from thickness 240 to thickness 245 when portion 222 of drive hub contoured end 220 projects away from first end 202 of spacer column 210. Contoured side 225 of portion 222 of drive hub contoured end 220 may have a curved profile 320 as portion 222 of drive hub contoured end 220 increases in thickness from 245 to 250 when drive hub contoured end 220 projects from thickness 245 to spacer drive hub flange 35. Profile 310 may be different from profile 320.

Portion 232 of driven hub contoured end 230 may contour and curve as portion 232 of driven hub contoured end 230 projects from second side 205 of spacer column 210 to spacer drive hub flange 35. Portion 232 of drive hub contoured end 220 may have a thickness of 240 at contact with second side 205 of spacer column 210. Contoured side 235 of portion 232 of driven hub contoured end 230 may have a curved profile 330 as portion 232 of driven hub contoured end 230 decreases from thickness 260 to thickness 265 when portion 232 of driven hub contoured end 230 projects away from second side 205 of spacer column 210. Contoured side 235 of portion 232 of driven hub contoured end 230 may have a curve profile 340 as portion 232 of driven hub contoured end 230 increases in thickness from 265 to 270 when portion 232 of driven hub contoured end 230 projects from thickness 265 to spacer driven hub flange 37. Profile 330 may be different from profile 340.

A device in accordance with the present disclosure may provide a spring spacer coupling that may flex to account for axial clearances required for machinery. A device in accordance with the present disclosure may provide a spring spacer coupling that is flexible to adjust for misalignment of two connected shafts is not limited to finite adjustment increments and also transmits torque axial load. A device in accordance with the present disclosure may provide a spring spacer coupling that has a larger dynamic range of rotor axial movement under load than conventional spacer couplings.

FIG. 4 illustrates a flow diagram for an example process to attach a spring coupler to a drive hub and a driven hub of a pump, arranged in accordance with at least some embodiments presented herein. The process in Fig. could be implemented using, for example, system 300 discussed above. An example process may include one or more operations, actions, or functions as illustrated by one or more of blocks S2, and/or S4. Although illustrated as discrete blocks, various blocks may be divided into additional blocks, combined into fewer blocks, or eliminated, depending on the desired implementation.

Processing may begin at block S2, "Attach a spacer drive hub flange of the spring spacer coupling to a drive hub with drive hub bolts, wherein the drive hub is attached to the drive shaft, the spacer drive hub flange of the spring spacer is connected to a radial outside edge of a drive hub contoured end, the drive hub contoured end is connected to a first end of a spacer column, a driven hub contoured end is connected to a second end of the spacer column, and a spacer driven hub flange is connected to a radial outside edge of the driven hub contoured end". At block S2, a spacer drive hub flange of the spring spacer coupling may be attached to a drive hub with drive hub bolts. The drive hub may be attached to the drive shaft. The spacer drive hub flange of the spring spacer may be connected to a radial outside edge of a drive hub contoured end. The drive hub contoured end may be connected to a first end of a spacer column. A driven hub contoured end may be connected to a second end of the spacer column. A spacer driven hub flange may be connected to a radial outside edge of the driven hub contoured end.

Processing may continue from block S2 to block S4, "Attach the spacer driven hub flange of the spring spacer coupling to a driven hub with driven hub bolts, wherein the driven hub is attached to the driven shaft, wherein a portion of the drive hub contoured end projects radially out from the first end of the spacer column with a first contoured side and a first flat side, the drive hub contoured end is configured to allow movement in an axial direction relative to a central axis of the spacer column, and the drive hub contoured end is configured to transmit torque and an axial load and a portion of the driven hub contoured end projects radially out from the second end of the spacer column with a second contoured side and a second flat side, the driven hub contoured end is configured to allow movement in an axial direction relative to the central axis of the spacer column, and the driven hub contoured end is configured to transmit torque and an axial load". At block S4, the spacer driven hub flange of the spring spacer coupling may be attached to a driven hub with driven hub bolts. The driven hub may be attached to the driven shaft. A portion of the drive hub contoured end may project radially out from the first end of the spacer column with a first contoured side and a first flat side. The drive hub contoured end may be configured to allow movement in an axial direction relative to a central axis of the spacer column. The drive hub contoured end may be configured to transmit torque and an axial load. A portion of the driven hub contoured end may project radially out from the second end of the spacer column with a second contoured side and a second flat side. The driven hub contoured end may be configured to allow movement in an axial direction relative to the central axis of the spacer column. The driven hub contoured end may be configured to transmit torque and an axial load.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for coupling a drive hub to a driven hub, the device comprising:
   a spacer column, wherein the spacer column has a first end, a second end, and a central axis;
   a drive hub contoured end connected to the first end of the spacer column, a portion of the drive hub contoured end projects radially out from the first end of the spacer column with a first contoured side towards the spacer column and a first flat side opposite the first contoured side, the drive hub contoured end is configured to allow movement in an axial direction relative to the central axis of the spacer column, and the drive hub contoured end is configured to transmit torque and an axial load;
   a spacer drive hub flange connected to a radial outside edge of the drive hub contoured end and configured to couple with the drive hub;
   a driven hub contoured end connected to the second end of the spacer column, a portion of the driven hub contoured end projects radially out from the second end of the spacer column with a second contoured side towards the spacer column and a second flat side opposite the second contoured side, the driven hub contoured end is configured to allow movement in an axial direction relative to the spacer column, and the driven hub contoured end is configured to transmit torque and an axial load; and
   a spacer driven hub flange connected to a radial outside edge of the driven hub contoured end and configured to couple to the driven hub.

2. The device of claim 1, wherein the portion of the drive hub contoured end has a first thickness in contact with the first end of the spacer column, decreases in thickness to a second thickness as the portion of the drive hub contoured end projects away from the spacer column, and increases in thickness to a third thickness as the portion of the drive hub contoured end projects from the second thickness to the spacer drive hub flange.

3. The device of claim 2, wherein the second thickness determines the amount of movement in the axial direction relative to the central axis of the spacer column allowed by the drive hub contoured end.

4. The device of claim 1, wherein the portion of the driven hub contoured end has a first thickness in contact with the second end of the spacer column, decreases in thickness to a second thickness as the portion of the driven hub contoured end projects away from the spacer column, and increases in thickness to a third thickness as the portion of the driven hub contoured end projects from the second thickness to the spacer driven hub flange.

5. The device of claim 4, wherein the second thickness determines the amount of movement in the axial direction relative to the central axis of the spacer column allowed by the driven hub contoured end.

6. The device of claim 1, wherein the drive hub contoured end flexes proportionally to a force applied to the drive hub contoured end in an axial direction relative to the central axis of the spacer column.

7. The device of claim 1, wherein the driven hub contoured end flexes proportionally to a force applied to the driven hub contoured end in an axial direction relative to the central axis of the spacer column.

8. The device of claim 1, wherein the drive hub contoured end flexes proportionally to a force applied to the drive hub contoured end in an axial direction relative to the central axis of the spacer column and the driven hub contoured end flexes proportionally to a force applied to the driven hub contoured end in an axial direction relative to the central axis of the spacer column.

9. A system for coupling a drive shaft to a driven shaft, the system comprising:
   a driver;
   a drive shaft, wherein the drive shaft is rotationally driven by the driver;
   a drive hub, wherein the drive hub is connected to the drive shaft;
   a driven hub,
   a driven shaft, wherein the driven shaft is connected to the driven hub; and
   a spring spacer coupling, wherein the spring spacer coupling includes:
      a spacer column, wherein the spacer column has a first end, a second end, and a central axis;
      a drive hub contoured end connected to the first end of the spacer column, a portion of the drive hub contoured end projects radially out from the first end of the spacer column with a first contoured side towards the spacer column and a first flat side opposite the first contoured side, the drive hub contoured end is configured to allow movement in an axial direction relative to the central axis of the spacer column, and the drive hub contoured end is configured to transmit torque and an axial load;

a spacer drive hub flange connected to a radial outside edge of the drive hub contoured end and configured to couple with the drive hub;

a driven hub contoured end connected to the second end of the spacer column, a portion of the driven hub contoured end projects radially out from the second end of the spacer column with a second contoured side towards the spacer column and a second flat side opposite the second contoured side, the driven hub contoured end is configured to allow movement in an axial direction relative to the spacer column, and the driven hub contoured end is configured to transmit torque and an axial load; and a spacer driven hub flange connected to a radial outside edge of the driven hub contoured end and configured to couple to the driven hub.

10. The system of claim 9, wherein the portion of the drive hub contoured end has a first thickness in contact with the first end of the spacer column, decreases in thickness to a second thickness as the portion of the drive hub contoured end projects away from the spacer column, and increases in thickness to a third thickness as the portion of the drive hub contoured end projects from the second thickness to the spacer drive hub flange.

11. The system of claim 10, wherein the second thickness determines the amount of movement in the axial direction relative to the central axis of the spacer column allowed by the drive hub contoured end.

12. The system of claim 9, wherein the portion of the driven hub contoured end has a first thickness in contact with the second end of the spacer column, decreases in thickness to a second thickness as the portion of the driven hub contoured end projects away from the spacer column, and increases in thickness to a third thickness as the portion of the driven hub contoured end projects from the second thickness to the spacer driven hub flange.

13. The system of claim 12, wherein the second thickness determines the amount of movement in the axial direction relative to the central axis of the spacer column allowed by the driven hub contoured end.

14. The system of claim 9, wherein the drive hub contoured end flexes proportionally to a force applied to the drive hub contoured end in an axial direction relative to the central axis of the spacer column.

15. The system of claim 9, wherein the driven hub contoured end flexes proportionally to a force applied to the driven hub contoured end in an axial direction relative to the central axis of the spacer column.

16. The system of claim 9, wherein the drive hub contoured end flexes proportionally to a force applied to the drive hub contoured end in an axial direction relative to the central axis of the spacer column and the driven hub contoured end flexes proportionally to a force applied to the driven hub contoured end in an axial direction relative to the central axis of the spacer column.

* * * * *